July 3, 1956 G. D. TUTTLE 2,753,086
SPREADER AGITATOR
Filed June 15, 1954 2 Sheets-Sheet 1
Fig. 1
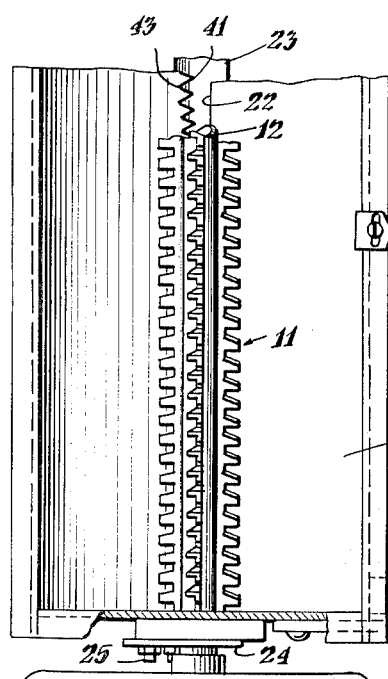
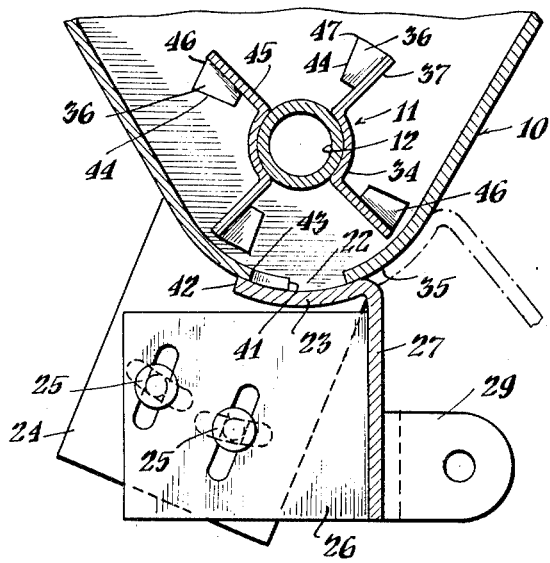
Fig. 3
INVENTOR
George D. Tuttle
BY Frank A. Bower
ATTORNEY July 3, 1956  G. D. TUTTLE  2,753,086
SPREADER AGITATOR
Filed June 15, 1954  2 Sheets-Sheet 2
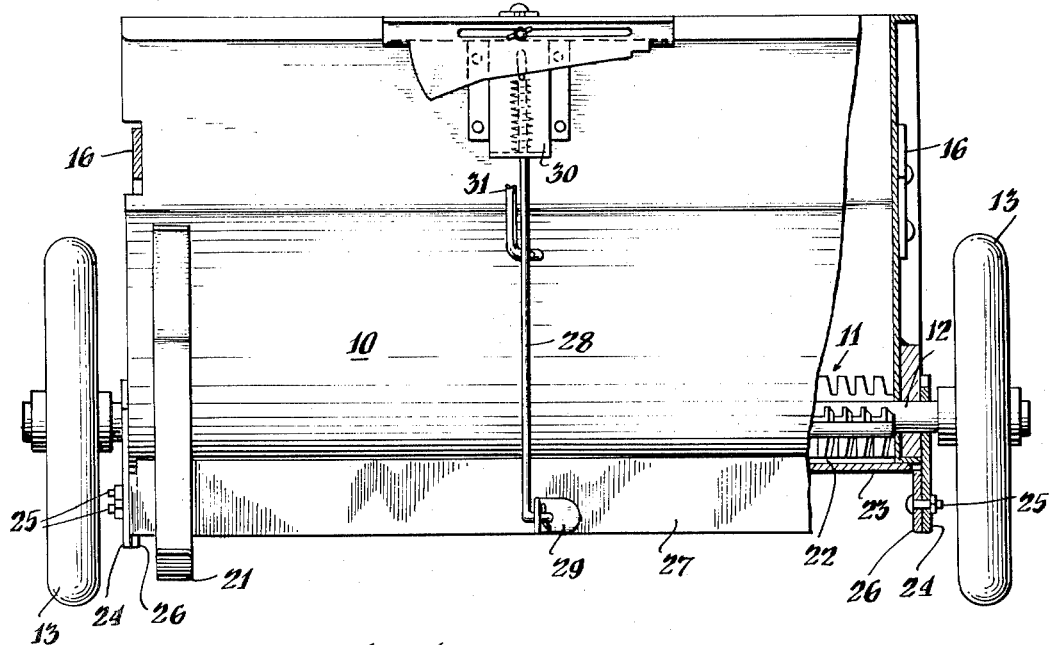
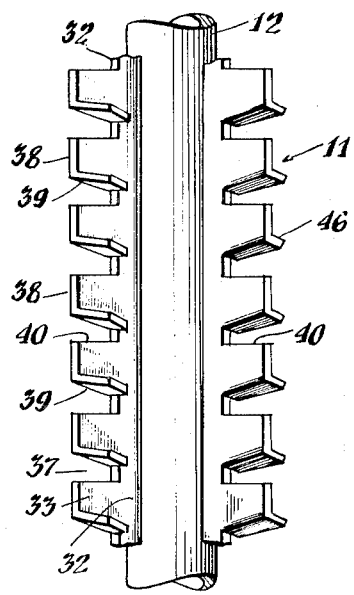
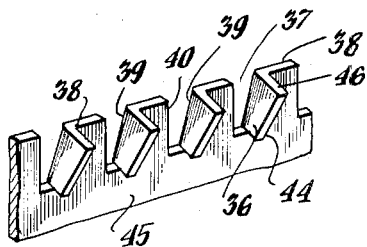
INVENTOR
George D. Tuttle
BY
Frank A. Bower
ATTORNEY

United States Patent Office 2,753,086
Patented July 3, 1956

2,753,086

SPREADER AGITATOR

George D. Tuttle, Columbus, Ohio, assignor to O. M. Scott and Sons Company, Marysville, Ohio, a corporation of Ohio Application June 15, 1954, Serial No. 436,967

9 Claims. (Cl. 222—177)

This invention relates to means for feeding seeds, fertilizer and the like from a spreader device and more particularly to an agitator in a spreader.

It is an object of this invention to provide means in a spreader device for smoothly and evenly distributing seeds, fertilizer and the like from the spreader device.

It is another object of this invention to provide distributing means in a spreader device which eliminates arching and piling up in the spreader device of seeds, fertilizer and the like during distribution from the spreader device.

It is a further object of this invention to provide means for distributing seeds, fertilizer and the like from a spreader device which easily eliminates lumps and caking and distributes evenly.

Still another object of this invention is to provide a spreader device agitator which is simple to fabricate and self-cleaning in construction.

A still further object of this invention is to provide a spreader device agitator which cooperates with the spreader feed control to maintain with precision the desired flow at each setting of the feed opening.

These and other objects of this invention will become more apparent upon consideration of the following description taken together with the accompanying drawings in which:

Fig. 1 is a partial plan view on reduced scale of a spreader containing the agitator of this invention;

Fig. 2 is a rear view with the handle part removed and parts broken away to show the agitator mounting in the spreader;

Fig. 3 is a partial vertical sectional view showing the agitator of this invention in the pit of the hopper with the feed control in closed position;

Fig. 4 is a partial plan view of the agitator; and

Fig. 5 is a partial perspective view of one of the agitator vanes of Fig. 4.

In general this invention provides a means in the pit of the hopper of a material spreading device for preparing and discharging the material in a smooth, even, well-distributed and accurate egress from the hopper. An agitator of this invention for preparing the seeds, fertilizer and the like includes in general, metal strips mounted on the rotating axle of the spreader device, which strips are formed with advance plow portions, notches, and angular edges cooperating to bring about the distribution of the seeds, fertilizer and the like.

In the drawings, the device of this invention is shown incorporated in a spreader device which has the various necessary components for carrying and spreading material such as fertilizer, seeds and the like over a surface area. The spreader shown in the drawing comprises a hopper 10 with an agitator 11 on a shaft 12 driven by one or both of a pair of wheels 13. A handle structure 15 comprises side strips 16 secured to the hopper at 17 and to the handle piece 18 at 19 with the hand grips 20 at the outer end of the handle piece. The spreader is pushed forward by the operator, toward the left as seen in Fig. 1, and struts 21, one on each side, support the spreader in standing position.

The agitator 11 stirs the material in the hopper 10 and feeds it out through a discharge opening 22 at the bottom of the hopper. To control the size of the discharge a shutter 23 swings arcuately in rotating action under the opening 22 to various adjustments and to closed position.

The shutter 23 is pivotally mounted on the shaft 12 by brackets 24 at each end of the shutter 23 as shown in Fig. 2. Each of the brackets 24 are adjustably fastened at 25 to a flange 26 of the respective ends of a shutter strip 27 which carries the shutter 23. The axial sectional view of Fig. 3 shows the shutter strip 27 with one of its flanges 26 attached at 25 to the bracket 24 and positioned with the shutter 23 closing the opening 22.

As described in the copending United States application Serial Number 423,602 filed by Virgil Peoples on April 16, 1954 for Spreader Control now Patent No. 2,718,986 issued Sept. 27, 1955, the positioning of the shutter 23 may be determined through a rod 28 which is attached to a flange 29 on the shutter strip 27. The rod 28 is alternately controlled by an adjustable shutter setting means 30 mounted on the hopper 10 as shown in Fig. 2 and by a shutter closing means 31 mounted on the handle structure 15 as shown in Fig. 1. Specific details of this means of shutter positioning, setting and closing are set forth in the above-mentioned copending application.

According to this invention to accomplish satisfactory spreading through proper delivery of the material the shaft 12 is provided with the special agitator 11 having vanes 32 provided with stirrer blades or teeth 33. The vanes 32 are integral with an intermediate arcuate strip 34 welded to the shaft 12, the axis of which is substantially concentric with the rounded bottom portion 35 of the hopper so that the agitator blades 33 at their tips pass in close proximity to these bottom surfaces and sweep over the discharge opening or slot 22. These blades 33 are integrally formed from the vanes by stamping and bending over a series of tapered wing pieces 36 leaving V-shaped notches 37 between the axial portions 38 of the blades 33. Preferably the notches 37 are less in width than the blades; and the wing pieces 36 are as shown facing in the same direction projecting forward from the leading faces of the vanes. Each wing or plow portion 36 is nearly at right angles to the axial blade portion 38 and is connected thereto by bend 39 inclined to the radial and facing the radial edge 40 at the other side of the notch 37.

This agitator 11 gives a very thorough cutting and mixing of the material in the hopper and at the lower portion of its movement in approaching and sweeping over the discharge opening 23 it distributes the outflow with an axial component through the discharge 23 in a very even manner.

The discharge opening 22 may be, for instance, $11/16''$ in full width with teeth or serrations 41 $3/16''$ in depth and a closure overlap of edge 42 of about $1/16''$. The edge 42 of shutter bar 27 may be bent around under the bar for reinforcement of the latter. The shutter 23 is mounted to slide very accurately.

Cooperating with this feeding of the material the setting of the shutter 23 controls the amount discharging according to the positioning of a suitable shutter setting means.

The edges of discharge orifice 22 may also be shaped to superpose a variation in the rate of feed as the shutter edge moves across the opening. For instance the closure edge 43 of the opening 22 may be serrated as shown with projection 41 of generally triangular formation to reduce the available area of the discharge in near closing positions of the shutter. These projections 41 may be shaped as desired to be rectangular rather than triangular or to be intermediate by having edges inclined to give a progressive reduction in available discharge area as closure is approached. This, together with the shutter setting means 30, will provide a very accurate predetermination of the feed rate.

The vanes 32 may be formed from a sheet of metal by stamping or similar forming which cuts the notches 37 and forms the wing pieces 36 from the cut out portions. The wing pieces 36 are formed on the advance side of the rotatable vanes in a plane not quite perpendicular to the axis of rotation. This gives the action of the agitator the axial component. Similarly the radial edge 40 and a leading edge 44 on the wing piece 36 are angled to assist the action of the vanes 32.

The leading edges 44 on the wing pieces 36 form an acute angle with a surface 45 on the leading side of the vane 32. This inward slant of the wing piece 36 shapes the wing piece 36 in a form tapering inwardly toward the surface 45 as best seen in Fig. 3. The sectional view of Fig. 3 also shows the formation of the wing pieces 36 in accommodation to the rounded bottom portion 35 of the hopper at the point where the blades pass in close proximity to the hopper surface. Each wing piece 36 has a top edge 46 which is non-perpendicular to its respective surface 45 and is inclined slightly to form a point 47 with the leading edge 44 in each of the wing pieces 36.

The vanes 32 are thus formed with a leading surface 45 which is serrated with a series of peripheral indented notches formed by the spaced apart blades 33 and provided with accompanying advance plow-like flanges shaped to provide an advance array of points and inclined edges and sloped surfaces in cooperation with accompanying edges of the notches. The notches make up a substantial portion of the area of each vane and the plow-like portions stand out in advance of the leading surface in a dimension correlated to the breadth of the notches. As will be pointed out in greater detail below, the resultant structure provides a means for the handling and treatment of seeds, fertilizer and like material, which is especially adapted to achieve the objects of this invention.

One means of forming the vane 32 with its blades 33 is the stamping of the vane 32 from a piece of sheet metal. When the vane 32 and blades 33 are formed in this manner the wing pieces 36 may be stamped out of the notches 37. In such a stamping the leading edge 44 and the radial edge 40 of each corresponding wing piece 36 and notch 37 represent the line of shearing of the sheet material. The edges 40 and 44 thus are correlative parts. The notch 37 and the wing piece 36 are correspondingly tapered and the bend 39 shapes the wing piece 36 to take advantage of the taper and slants the wing piece 36 as described above and to provide the edges 44 and 46 with a desirable inclination.

In operation the agitator 11, turning with the wheels 13 upon the progression of the spreader, churns within any seeds, fertilizer or like material lying in the pit of the hopper 10. The churning action simultaneously bites into the material and pushes it across the discharge opening 22. The agitator 10 is positioned at the lowest-most point of the hopper 10 so that it is imbedded in the material during substantially all of the distribution operation. The action of the agitator 11 engages the material throughout the periphery of the agitator. The biting action thus occurs not only adjacent the discharge opening 22 but all around the agitator 11.

As the agitator 11 moves through the material the advance wing pieces 36 and the edges of the vanes 32 work on the material to prepare it and position it for egress through the discharge opening 22. This action includes moving the material axially across the hopper to prevent piling up and chopping into the material to prevent tunneling in the material and forming an arch. Also, the wing pieces 36 and the edges 44 and 46 plow and shear through the material to break up lumps and conglomerations formed in the material, particularly fertilizers.

The wing pieces 36 are neither perpendicular to the axis of the shaft 12 nor to the surface 45 but are slightly inclined thereto. Consequently the wing pieces 36, in passing through the material for distribution, plow and roll the material which slides off the wing piece 36 face and through the trailing notch 37 in a novel and beneficial manner.

It is important in the operation of a spreader device to obtain an even distribution of the material. This distribution includes evenness across the width of the spreader and also a uniformity in the progressive distribution from the discharge opening along the path of travel of the spreader device. A suitable spreader control mechanism such as described above is manipulatable to provide a variable discharge aperture such as opening 22 in the above described embodiment. To insure the effectiveness and accuracy of the control mechanism the spreader agitator must deliver the material to the discharge opening in a homogeneous composition and in regular increments and uniform size.

The seeds, fertilizer and like material distributed by a spreader device of this invention require a variety of treatments according to the demands of the various types of materials distributed by the spreader. For example, in the spreading of a fertilizer type material the spreader device by means of the agitator of this invention can combat the problem of lumping or conglomeration common in certain types of fertilizers and avoid the occurrence of arching or tunneling in the fertilizer material. Likewise the problem of piling up at one side of the spreader, common in lime spreading, is prevented by the agitator of this invention through its constant axial feeding. In addition, the stirring action of the agitator provides an evenness in the density of the fertilizer material that is forced through the discharge openings of the spreader.

In the distribution of seed material from a spreader device an evenness is even more important than with fertilizer. In addition, the seed material is most often composed of a mixture of seeds of varying size and configuration. In the spreading of such seed mixtures the gradual separation of the seed from an even mixture is a natural result of the differences in size, configuration and density. For example, clover seed is round, relatively small and dense. Consequently it has a tendency to separate out from lighter, larger seeds. It is important to be able to counteract this separation of the seeds in a mixture with an agitator of the spreader. The agitator of this invention by constantly stirring the seed material adjacent the discharge opening helps prevent separation of mixtures and to assure an even distribution of all of the component seeds making up the seed mixture.

Other advantages of the agitator of this invention include the action of the agitator on the distributed material at and across the discharge opening. The vanes rotate to incrementally pick up the distributed material and with the individual blades force it past the discharge opening causing part of it to pass out of the hopper by an action of combined pressure and gravity. The shearing action of the advance wing sections together with the edges around the notches breaks up any clogs which tend to block the discharge opening. The clogs are wiped away from the opening and the clogging of the discharge opening is avoided. In this way stoppages in the laying down of distributed material are avoided and a continuous stream of flowing material provides a uniformly spread layer. This uniformity is aided by the above mentioned advantage of the agitator of this invention in the break-up of lumps of material in the distributed material before it reaches the discharge opening. In this way the agitator guarantees the presentation of the material to the discharge openings in a granular consistency which will pass through the opening of the spreader. This particular feature is particularly advantageous in the spreading of lime in a uniform spread.

Other advantages of the agitator of this invention include the simplicity of its manufacture. As shown in the above described embodiment the agitator of this invention can be composed of two pieces of stamped sheet metal mounted simply and easily upon a suitably rotatable shaft. The ductility and malleability of the thin metal of the vanes permits the pieces to be formed in a die stamping operation on a mass production basis with accuracy. The stamping operation easily provides the agitator with its important features.

It will be understood that the above described embodiment may be modified within the spirit of this invention. The agitator may be incorporated in various other spreader devices having different means of spreader control than those shown and described herein. The operation of applicant's spreader device has been described as applied to seeds, fertilizer, lime and like garden materials. It will be understood that applicant's device is not limited to the spreading and distribution of these particular materials but may be applied to the spreading of similar materials which present similar or related distribution problems. Accordingly, it is intended that this invention be limited only by the scope of the appended claims.

I claim:

1. In a spreader for seeds, fertilizer and the like: a hopper for containing the material to be spread and having a bottom wall with discharge openings therethrough extending in a row for passing material from the hopper; a rotary agitator adjacent said bottom wall and extending along said row of openings; said agitator comprising a series of rows of blades; each blade in a row of blades having an outwardly tapered portion in a substantially radial plane and integral therewith a wing portion at an angle to said outwardly tapered portion; and wheel driven means rotating said agitator so that the peripheral edges of said wing portions of said blades pass over the row of said discharge openings in advance of said outwardly tapered portion of said blades in forward movement of said spreader.

2. A spreader as set forth in claim 1, in which the wing portion of each blade is connected thereto by a bend at an angle to the radius of the agitator axis so that the wing surfaces are inclined to planes normal to said axis and shift material axially during rotation of the agitator.

3. In a spreader as set forth in claim 1, the wing portion of each blade having a leading edge made up of at least two sections formed at different angles to the face of said blade and a leading apex of said wing portion formed by said two-angle leading edge.

4. A spreader as set forth in claim 1, in which the wing portions of the blades are inwardly tapered from largest dimension at the periphery.

5. An agitator assembly for a spreader device comprising: a shaft rotatable on a forward movement of said spreader, a stamped thin ductile sheet composed of a curved central portion and a pair of vanes integral with and extending outwardly from opposite sides of said central portion to form continuous strips along said central portion, said central portion mounted on said shaft, a plurality of blades extending from each of said vanes with each blade having laterally extending edges, spaced opposing laterally extending edges of adjacent blades forming passages between said blades, each blade having at least one of said lateral edges at an angle to a radial plane portion to provide an outwardly tapering blade, a wing portion projecting generally normal to said blade in the direction of forward rotation and connected to said blade along a respective angularly positioned lateral edge setting the normally projecting wing at an angle to a plane normal to said axis.

6. A spreader for distributing granular material evenly over a surface comprising: a hopper for containing said material having a bottom wall with teeth projections disposed substantially fore and aft having generally convergent side edges; a shutter adjacent the exterior of said bottom wall mounted on the hopper to move fore and aft to coact with said teeth projections and define a row of selectively variable openings through the bottom wall; a rotary agitator extending along said row of openings and having a vane projecting radially on said agitator and rotating therewith, said vane having a row of radially projecting blades extending in spaced relationship to each other along the vane with each blade sweeping across a respective opening, said blades having lateral edges along each side with opposed lateral edges of adjacent spaced blades forming passages through said vane, each blade having at least one of said lateral edges at an angle to a radial plane normal to the axis of said agitator to provide each blade with a radially outwardly convergent taper, a wing on said angled edge and having a surface extending generally normal to said blade in the direction of forward rotation and at an angle to the radial plane to assist in the even distribution of the material, said blades positioned on said agitator to pass across said openings and move said wing in advance of said blade to provide a continuous even flow of material across the front of said blade and through the bottom wall.

7. For use in combination with a hopper having a transverse bottom wall with discharge outlet means provided transversely across said bottom wall, an agitator adapted to be mounted for rotation in the hopper on a transverse axis above and parallel to the hopper bottom, comprising: a shaft; at least one elongate thin sheet structure comprising a base portion and at least one elongate vane integral with and extending outwardly from one of the long edges of said elongate base portion to form a substantially continuous strip along said base portion; means securing said base portion on said shaft; a plurality of blades extending from said vane and substantially in a plane containing the axis of said shaft with each blade having side edges and spaced from adjacent blades to provide a passage between each pair of adjacent blades, at least one of the side edges of at least a portion of said blades forming an angle with a plane normal to the axis of said shaft to provide outwardly convergently tapering blades; an individual wing portion rigid on each of said angled side edges and bent to be disposed in the direction of forward rotation so each of said wing portions will lead its respective blade and the plane angle between each wing portion and its respective blade will be at least 90°.

8. An agitator for a hopper type material spreader comprising: a shaft; a vane element extending along and connected to said shaft intermediate its ends and disposed substantially on a plane through the axis of said shaft; a plurality of blades extending radially outwardly, spaced apart and fixed along said vane, with at least one side edge of said blades being angled relative to a plane normal to the shaft axis to provide each of said blades with an outwardly convergent taper; an individual wing portion rigid on each blade on said angled side edge and projected in the direction of forward rotation so the wing portions will lead the respective blades and the plane angle between each wing portion and the forward face of its respective blade will be at least 90°.

9. An agitator for a hopper type material spreader comprising: a shaft; a plurality of substantially flat blades extending radially outwardly, spaced apart, fixed along said shaft and substantially in a plane containing the axis of said shaft, with at least one side edge of said blades being angled relative to a plane normal to the shaft axis to provide said blades with an outwardly convergent taper; and an individual wing portion rigid on each blade on said angled side edge and projected in the direction of forward rotation so the wing portions will lead the respective blades and the plane angle between each wing portion and the forward faces of its respective blade will be at least 90°.

References Cited in the file of this patent

UNITED STATES PATENTS

| | | |
|---|---|---|
| 2,533,386 | Masters | Dec. 12, 1950 |
| 2,678,145 | Juzwiak et al. | May 11, 1954 |